United States Patent
Sadot et al.

(10) Patent No.: US 9,088,494 B2
(45) Date of Patent: Jul. 21, 2015

(54) PACKET FRAGMENTATION PREVENTION

(75) Inventors: Emek Sadot, Givatayim (IL); Itai Ephraim Zilbershtein, Petach-Tikva (IL)

(73) Assignee: Avaya Communication Israel LTD., Tel Aviv (IL)

( * ) Notice: Subject to any disclaimer, the term of this patent is extended or adjusted under 35 U.S.C. 154(b) by 3449 days.

(21) Appl. No.: 10/180,190

(22) Filed: Jun. 26, 2002

(65) Prior Publication Data

US 2004/0001444 A1 Jan. 1, 2004

(51) Int. Cl.
*H04L 12/801* (2013.01)
*H04L 12/805* (2013.01)
*H04L 29/06* (2006.01)

(52) U.S. Cl.
CPC ............... *H04L 47/10* (2013.01); *H04L 47/36* (2013.01); *H04L 69/166* (2013.01)

(58) Field of Classification Search
None
See application file for complete search history.

(56) References Cited

U.S. PATENT DOCUMENTS

| | | | | |
|---|---|---|---|---|
| 5,425,023 | A * | 6/1995 | Haraguchi et al. | 370/400 |
| 5,842,040 | A * | 11/1998 | Hughes et al. | 710/11 |
| 5,892,753 | A * | 4/1999 | Badt et al. | 370/233 |
| 5,931,961 | A * | 8/1999 | Ranganathan et al. | 714/712 |
| 6,212,190 | B1 * | 4/2001 | Mulligan | 370/400 |
| 6,253,321 | B1 * | 6/2001 | Nikander et al. | 713/160 |
| 6,496,935 | B1 * | 12/2002 | Fink et al. | 726/13 |
| 6,707,799 | B1 * | 3/2004 | Chui | 370/282 |
| 6,795,866 | B1 * | 9/2004 | Mankude et al. | 709/238 |
| 6,956,867 | B1 * | 10/2005 | Suga | 370/465 |
| 6,973,097 | B1 * | 12/2005 | Donzis et al. | 370/470 |
| 7,042,907 | B2 * | 5/2006 | Matsunaga | 370/469 |
| 7,215,637 | B1 * | 5/2007 | Ferguson et al. | 370/230.1 |
| 7,275,093 | B1 * | 9/2007 | Freed et al. | 709/223 |
| 7,292,530 | B2 * | 11/2007 | Christensen | 370/230.1 |
| 7,298,745 | B2 * | 11/2007 | Egevang | 370/394 |
| 7,451,227 | B2 * | 11/2008 | Lee et al. | 709/232 |
| 2001/0034791 | A1 * | 10/2001 | Clubb et al. | 709/238 |
| 2002/0040402 | A1 * | 4/2002 | Levy-Abegnoli et al. | 709/229 |
| 2002/0071436 | A1 | 6/2002 | Border et al. | |
| 2002/0131364 | A1 * | 9/2002 | Virtanen et al. | 370/230 |
| 2003/0039249 | A1 * | 2/2003 | Basso et al. | 370/394 |
| 2003/0074467 | A1 * | 4/2003 | Oblak et al. | 709/238 |
| 2003/0126272 | A1 * | 7/2003 | Corl et al. | 709/230 |

FOREIGN PATENT DOCUMENTS

EP 1202508 A1 5/2002

OTHER PUBLICATIONS

RFC 1191 from Network Working Group "Path MTU Discovery" by J. Mogul et al. Nov. 1990.*

* cited by examiner

*Primary Examiner* — Brian Roberts
(74) *Attorney, Agent, or Firm* — Muncy, Geissler, Olds & Lowe, P.C.

(57) ABSTRACT

A method of avoiding packet fragmentation. The method includes receiving a data packet belonging to a data connection, determining whether the received data packet was fragmented or determining whether the received data packet is expected to be fragmented on the way to its destination and registering the data connection of the received packet in a list of connections that carried packets that were fragmented or were expected to be fragmented.

18 Claims, 3 Drawing Sheets

PACKET FRAGMENTATION PREVENTION

FIELD OF THE INVENTION

The present invention relates to data communication networks and in particular to preventing fragmentation of packets in data networks.

BACKGROUND OF THE INVENTION

Communication between computers over packet based networks is generally viewed as a multi layer process. Each layer is in charge of different aspects of the communication process and is controlled by different protocols. For example, a file transfer through the Internet comprises: a link layer (also known as layer 2), a network layer (layer 3), a transport layer (layer 4) and an application layer (layer 7). The link layer interfaces the hardware and the physical link between communicating systems. The network layer handles the movement of data through a packet based network, using a protocol such as the IP (Internet protocol). The transport layer provides flow control of data between two computers, using a protocol such as TCP (transmission control protocol). The application layer handles the details of a particular application such as FTP (file transfer protocol). In packet based networks, data is transmitted in units, called datagrams or packets. Generally a packet comprises an application data portion, a network layer header and a transport layer header.

Each communication link in a packet based network generally has a limitation on the maximal size of a packet it can transmit. This maximal size is called the maximum transmission unit (MTU) of the link. For example, Ethernet communication links usually limit a packet to the size of 1500 bytes. When two computers communicate across a network, the smallest MTU of the communication path between the two computers is called the path MTU. The path MTU between two computers may be different in each direction and/or may vary in time due to changes in the links forming the path.

If a router receives a packet, which is larger than the size it can forward in the link leading to the destination of the packet, the router breaks up the packet to smaller fragments, such that each fragment is smaller or equal to the MTU. Each fragment is itself a packet, with its own network layer header and is routed independent of any other packets. Each fragment packet comprises a new network layer header (which is generally a copy of the network layer header of the original packet) and a continuation of the original packet's data. The transport layer header and any specific portion of the application portion are copied only into one of the fragments. Typically, a fragmented packet is not reassembled until it reaches its final destination. If a fragment packet is lost, the original unfragmented packet of which it was a part needs to be retransmitted entirely.

Many Web sites are hosted by a plurality of servers, because of the large number of clients accessing the Web site, the large volume of the information carried by the Web site and/or for redundancy purposes. A load balancer receives the packets directed to the Web site and forwards them to a respective server based on one or more parameters. Load balancers are also used for other purposes, for example, for redirecting HTTP (an Internet browser protocol) requests to a proxy cache.

Some load balancers redirect packets based on the contents of the network layer header of the packet. Other load balancers redirect the packets based on the transport layer header of the packets or the transport layer header and the network layer header. In yet other load balancers, the packets are redirected based on the application data of the packets and optionally some of their header information. Additionally, some load balancers generate separate connections with the servers and the clients and bridge between the separate connections in a procedure referred to as splicing.

A load balancer needs to transfer all packets of a fragmented packet to the same server so that they can be reconstructed by the server. A load balancer which uses information beyond that included in the network layer header will not have enough information to perform load balancing of fragments beyond the first fragment, because the transport layer header and application data are not copied to all the fragments. One solution is for the load balancer to keep a table, such as a fragment control table (FCT), which keeps track of all fragmented packets that arrive at the load balancer until all the packets created from the fragmented packet have been forwarded to a corresponding server. This solution introduces a lot of overhead which affects the performance of the load balancer and adds to the complexity of the load balancer.

Other network elements such as proxies and firewalls, share the need to deal with problems caused by fragmented packets.

SUMMARY OF THE INVENTION

An aspect of some embodiments of the invention relates to a network element which actively avoids packet fragmentation. In some embodiments of the invention, when the network element receives a fragmented packet or receives a packet larger than the size that it can transfer without fragmentation, the network element disconnects the connection on which the packet was received. Optionally, the network element notifies the client, before disconnecting the connection, to start a subsequent connection to a same destination with a smaller maximal packet size. Alternatively or additionally, when the client reconnects, the network element forces the connection at a smaller maximal packet size that avoids fragmentation.

An aspect of some embodiments of the invention relates to a network element that recognizes some clients and initially forces a connection with them at a reduced maximal packet size. Optionally, periodically the network element rechecks the optimal packet size for the client to see if the communication link has been improved and can support a larger size packet.

An aspect of some embodiments of the invention relates to an application layer network element which forces the connections it splices to operate with maximal packet sizes which do not require change of packet sizes in passing packets between the connections.

There is therefore provided in accordance with an embodiment of the present invention, a method of avoiding packet fragmentation, comprising receiving a data packet belonging to a data connection, determining whether the received data packet was fragmented or determining whether the received data packet is expected to be fragmented on the way to its destination; and registering the data connection of the received packet in a list of connections that carried packets that were fragmented or were expected to be fragmented.

Optionally, receiving the data packet comprises receiving a packet belonging to a TCP connection. Optionally, receiving the data packet and registering the connection are performed by an intermediate network element, which is not an end unit of the connection.

Optionally, the intermediate network element comprises a load balancer, a firewall and/or a proxy. Optionally, the intermediate network element does not establish a TCP connection with a source of the data packet. Alternatively, the intermediate network element establishes a TCP connection with a source of the data packet. Optionally, determining whether the received data packet was fragmented or determining whether the data packet is expected to be fragmented comprises determining whether a fragmentation flag of the packet is set and/or determining whether the packet is to be fragmented by the determining unit.

Optionally, determining whether the received data packet was fragmented or determining whether the data packet is expected to be fragmented comprises measuring the maximal transmission unit (MTU) of a path to the destination of the packet and determining whether the packet is larger than the determined MTU. Optionally, measuring the MTU is performed before receiving the packet. Alternatively, measuring the MTU is performed after receiving the packet. Optionally, the method includes transmitting an error message to at least one end unit of the connection, instructing the end unit to use a maximal packet size included in the error message.

Optionally, the maximal packet size included in the error message comprises the size of the received packet or a size different from the size of the received packet. Optionally, the maximal packet size included in the error message comprises a size determined as the MTU of a path from a unit performing the determination to a destination of the received packet.

Optionally, the method includes identifying a subsequent request to form a subsequent connection by at least one of the end units of the disconnected connection and forcing the subsequent connection to use packets of a size up to a maximal size smaller than or equal to the size of the received packet. Optionally, identifying a subsequent request to form a subsequent connection by at least one of the end units of the disconnected connection comprises identifying a subsequent request to form a connection between end units of the disconnected connection.

Optionally, the method includes registering the data connection of the received packet in the list of connections comprises registering the data connection according to an identity of a source of the packet. Optionally, the method includes disconnecting the connection to which the packet belongs, responsive to a determination that the received data packet was fragmented or is expected to be fragmented.

There is further provided in accordance with an embodiment of the present invention, a method of avoiding packet fragmentation, comprising receiving a data packet belonging to a data connection, determining whether the received data packet was fragmented or determining whether the received data packet is expected to be fragmented on the way to its destination, and disconnecting the connection to which the packet belongs, responsive to a determination that the received data packet was fragmented or is expected to be fragmented.

Optionally, disconnecting the connection comprises transmitting a reset message on the connection and/or discarding the received packet. Optionally, a message to at least one end unit of the connection, instructing the end unit to use a maximal packet size included in the message.

There is further provided in accordance with an embodiment of the present invention, a network element, comprising an input interface adapted to receive packets, a determination unit adapted to determine, for at least some of the received packets, whether the packets were fragmented or whether the packets are expected to be fragmented on their way to their destinations, and a discarding unit adapted to discard packets for which it was determined that the packet was fragmented or is expected to be fragmented.

Optionally, the network element comprises a load balancer. Optionally, the network element includes a transmission unit adapted to transmit error messages to sources of packets discarded by the discarding unit.

There is further provided in accordance with an embodiment of the present invention, a method of establishing a connection between a client and a network element, comprising determining a minimum MTU between the network element and at least one server establishing a connection between the network element and the client, and transmitting from the network element to the client a maximal size of packets to be transmitted on the established connection, the maximal size being determined responsive to the determined minimum MTU.

Optionally, the maximal size of packets transmitted to the client comprises the minimal MTU value of the at least one server. Optionally, the at least one server comprises a plurality of servers and the maximal size of packets transmitted to the client comprises an MTU value of a server estimated to service the client.

Optionally, determining the minimum MTU comprises referencing a predetermined list of MTUs of the at least one server. Optionally, determining the minimum MTU comprises transmitting MTU measurement packets to at least one of the servers.

There is further provided in accordance with an embodiment of the present invention, a method of preventing fragmentation, comprising receiving a request to establish a connection, comparing a value of at least one field of the request to a list of values of the field and respective maximal packet sizes, and establishing a connection responsive to the received request, with a maximal packet size from an entry of the list matching the value of the at least one field from the received request.

Optionally, the at least one field comprises a source address field. Optionally, the maximal packet size is for packets transmitted in the same direction as the received request to establish a connection. Optionally, receiving the request and comparing the value to the list are performed by an intermediate network, which is not an end unit of the connection.

BRIEF DESCRIPTION OF FIGURES

Particular exemplary embodiments of the invention will be described with reference to the following description of embodiments in conjunction with the figures, wherein identical structures, elements or parts which appear in more than one figure are preferably labeled with a same or similar number in all the figures in which they appear, in which.

DETAILED DESCRIPTION OF EMBODIMENTS

Figure 1:
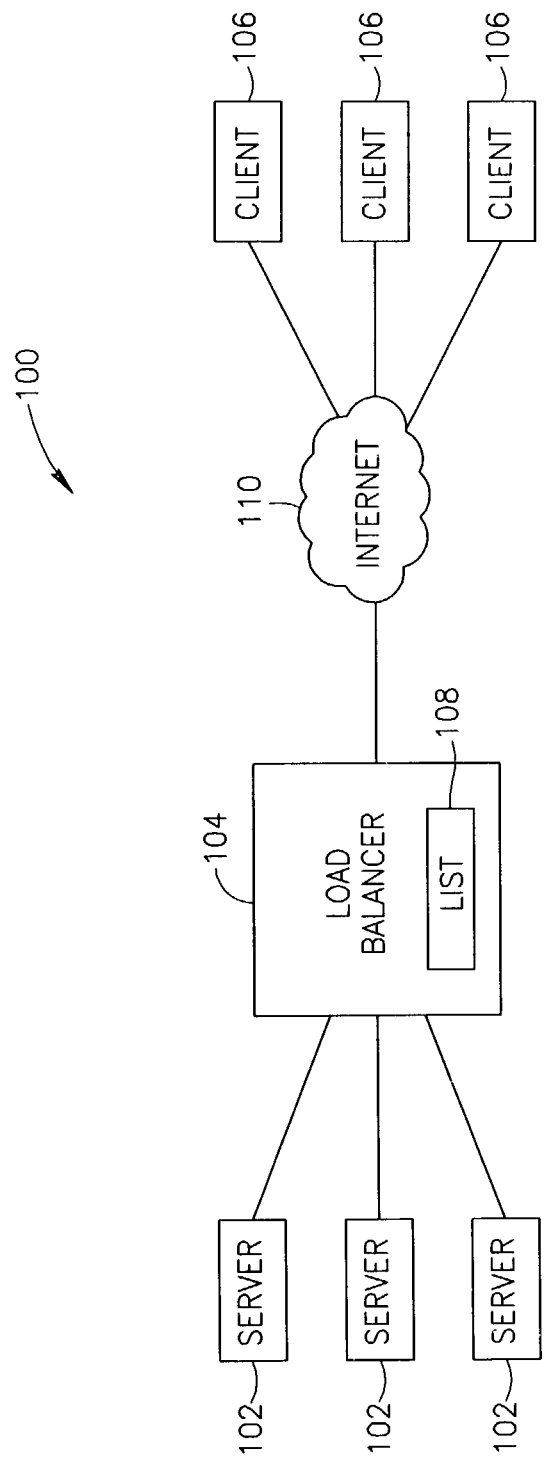
FIG. 1 is a schematic block diagram of a server farm, useful in explaining an embodiment of the present invention.

FIG. 1 is a schematic block diagram of a server farm 100, in accordance with an embodiment of the present invention.

Server farm 100 comprises a plurality of servers 102 which host pages of one or more web sites. Client computers 106 forward request messages to servers 102, for example through the Internet 110. A load balancer 104 receives the messages directed from clients 106 to servers 102 and forwards each message to one of servers 102, which is selected according to substantially any load balancing method known in the art. Response packets directed from servers 102 are optionally sent to load balancer 104, which forwards the response packets to the client 106. Alternatively or additionally, response packets from servers 102 are forwarded directly to clients 106 without passing through load balancer 104.

Figure 3:
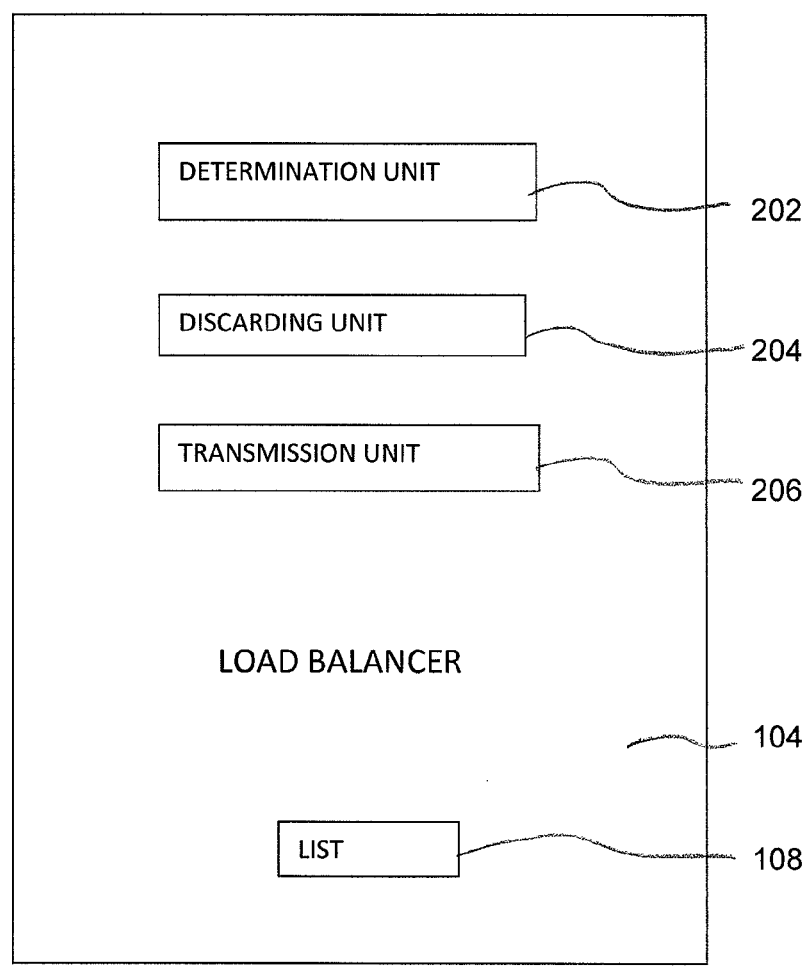
FIG. 3 is a schematic block diagram illustrating a network element according to an embodiment of the present invention.

In an exemplary embodiment of the invention, load balancer 104 manages a list 108 of clients 106 and respective maximal non fragmented packet sizes to be used on connections with the clients. In some embodiments of the invention, clients 106 are identified in list 108 according to their IP address. The use of list 108 is described herein below. As illustrated in FIG. 3, load balancer 104 may also include a determining unit 202, a discarding unit 204, and a transmission unit 206 which are used for performing these respective functions as described below.

Figure 2:
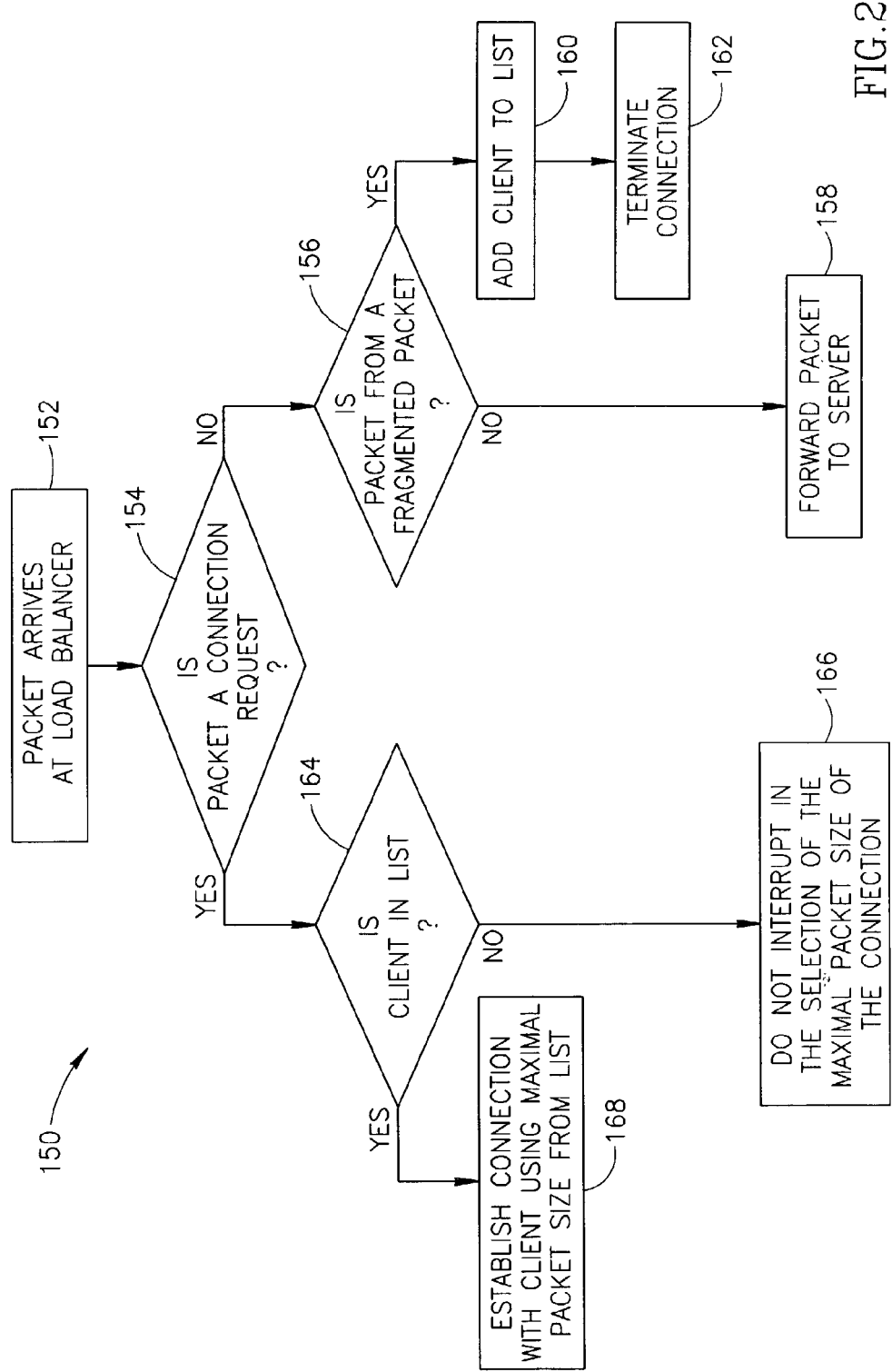
FIG. 2 is a flowchart of a process of actively avoiding reception of fragmented packets, in accordance with an embodiment of the present invention.

FIG. 2 is a flowchart 150 of the acts of a process of actively avoiding reception of fragmented packets, performed by a network element such as a load balancer 104, in accordance with some embodiments of the present invention. At 152, a packet arrives at load balancer 104. At 154, load balancer 104 optionally checks if the packet is a connection request. If the packet is not a connection request, load balancer 104 further checks, for example according to the fragment field of the network layer header of the packet, if the packet that arrived is from a fragmented packet (156).

If the packet is not from a fragmented packet, it is forwarded to a server (158), according to the connection to which the packet belongs, as is known in the art. If the packet is from a fragmented packet, load balancer 104 optionally adds the details of client 106 to list 108 (160). Following act 160, load balancer 104 optionally discards the packet and/or terminates the connection to which the packet belongs (162).

In some embodiments of the invention, an error message is sent to client 106, for example an ICMP unreachable error, in which the current packet is rejected. Optionally, the error message indicates a maximal packet size to be used by the client 106. In some embodiments of the invention, the maximal packet size in the error message is taken from list 108. Alternatively, the maximal packet size in the error message is determined according to the size of the fragmented packet received.

Alternatively or additionally to sending an error message, when the client 106 attempts to reconnect, load balancer 104 forces a smaller packet size on the new connection, based on the maximal size recorded in list 108, as shown infra in act 168.

In some embodiments of the invention, as described above in act 162, the connection is terminated by load balancer 104. Optionally, the connection is terminated by client 106 and/or server 102 in a timing out procedure, caused by the discarding of packets by load balancer 104. Alternatively or additionally, load balancer 104 actively terminates the connection by transmitting a disconnect message to the client 106 and/or to the server 102. The disconnect message may comprise, for example, a TCP message with the reset flag set.

If (154) the packet that arrived is a connection request, load balancer 104 optionally checks if client 106 is in list 108 (164). If client 106 is recorded in the list 108, load balancer 104 forces (168) the connection established with client 106 to have a maximal packet size as recorded for the client in list 108. In some embodiments of the invention, the maximal packet size is forced by intercepting an answer packet from server 102 to client 106 and setting the maximal segment size (MSS) parameter of the packet. Optionally, the setting of the MSS field is performed only if the intercepted packet does not have an MSS field, or the MSS value of the intercepted packet is greater than the value to be forced by load balancer 104. If, however, the MSS field of the intercepted packet has a smaller value, load balancer 104 leaves the smaller value intact, as the current value may be necessary for a network link not under the control of load balancer 104. Optionally, if (164) client 106 is not recorded in list 108, load balancer 104 does not interrupt in the selection of the maximal size packet of the connection (166).

In some embodiments of the invention, when a fragmented packet is received by load balancer 104, load balancer 104 actively determines the maximal packet size (i.e., the MTU) which can be transmitted from the client without fragmentation. The actively determined value is then used in list 108 and/or in the transmitted error message. Actively determining the path MTU is useful to check if the packet fragmentation was caused by a random interference or is a feature of the connection to the client. Actively determining the maximal packet size is optionally performed using any MTU discovery method known in the art, such as transmitting ping packets and/or traceroute packets with or without don't fragment bits. In some embodiments of the invention, a method which determines the MTU from load balancer 104 to the client is used, and it is assumed that the path from the client to load balancer 104 has the same MTU as the path from load balancer 104 to the client. Alternatively or additionally, a method that determines the MTU from the client to load balancer 104, is used, for example, a method that examines response ping packets from the client.

As described above, in some embodiments of the invention, clients 106 are listed in list 108 if a fragmented packet is received from the client 106. Optionally, clients 106 not connecting to the web site serviced by load balancer 104 for longer than a predetermined time are removed from list 108. Alternatively, the entries of list 108 are removed from the list a predetermined time (e.g. a day, a week) after they are created, regardless of their use, so that the MTU of the path to the clients 106 is periodically reexamined. Further alternatively, entries are removed from list 108 only in order to make room for new entries when the list is full. Optionally, in such cases, the oldest entry, the entry not used for the longest time or the entry least used is removed from list 108 to make room for the new entry.

In some embodiments of the invention, one or more clients 106 are listed in list 108 based on predetermined data, for example, subscription of the clients to the site serviced by load balancer 104. Optionally, upon subscription of the client to the site, load balancer 104 determines the MTU of the path from the client 106 to the load balancer 104 and registers the client ID and the respective MTU in list 108.

In some embodiments of the invention, load balancer 104 periodically actively determines the path MTU of clients that are listed in list 108 in order to verify that the data in list 108 is up to date. In some embodiments of the invention, the periodic determination is performed only for clients 106 that did not access load balancer 104 for more than a predetermined amount of time.

In some embodiments of the invention, load balancer 104 does not cause disconnection of some connections although the connection carries fragmented packets. Optionally, a connection which was disconnected consecutively for a predetermined number of times, is not disconnected again, in order not to prevent the client from connecting to the web site. For example, if the path MTU between a client 106 and a load balancer 104 is smaller than a transmission size which client 106 can practicably meet, the client is allowed to connect even if load balancer 104 receives fragmented packets. In some embodiments of the invention, load balancer 104 keeps track of clients who are allowed to connect with fragmented packets and does not try to impose a low maximal transmission size on these clients. Alternatively, a client 106 that cannot conform to the packet size demands of a load balancer 104 is not allowed to connect.

Although the above description relates to preventing the reception of fragmented packets from client 106, the above procedures may be used also to prevent reception of fragmented packets in the other direction, i.e., from servers 102.

In some embodiments of the invention, load balancer 104 also closes connections which force the load balancer to fragment packets. Optionally, in these embodiments, when load balancer 104 receives a packet of a size which the load balancer cannot forward to its destination without fragmentation, load balancer 104 handles the packets using any of the methods described above for handling received fragmented packets.

In some embodiments of the invention, load balancer 104 also closes connections on which packets transmitted from load balancer 104 toward servers 102 will be fragmented on their way to the server 102 after load balancer 104. Optionally, load balancer 104 periodically and/or at start up, determines the MTU of the paths to each of servers 102. When a packet is received (200) by load balancer 104, the load balancer optionally determines whether the size of the packet is greater than the MTU to its respective server 102. If the size of the packet is greater than the MTU to its respective server 102, load balancer uses any of the methods described above in relation to fragmented packets. In an exemplary embodiment of the invention, server 102 closes the connection and forces a subsequent connection from the same client 106 to use a maximal packet size smaller than the MTU to the server servicing the client. In some embodiments of the invention, list 108 states for each client 106 the minimum of the MTU of the path from client 106 to load balancer 104 and of the path from load balancer 104 to the respective server 102.

Optionally, the determination of whether the packet is fragmented and the determination of whether the packet is larger than the MTU of the path to the server is performed together. That is, for each packet received by load balancer 104, the load balancer determines whether the packet is fragmented or is greater than the MTU of the path to the respective server 102 of the packet (referred to herein as the server MTU). If the packet is fragmented or is greater than the server MTU, load balancer 104 optionally closes the connection of the packet and lists the minimum of the packet size and the server MTU in list 108 for the client 106 sending the packet.

In some embodiments of the invention, all of servers 102 are on a LAN with load balancer 104 and the minimum MTU for all of servers 102 is the same, for example 1500 bytes (Ethernet encapsulation). In other embodiments of the invention, different servers 102 have different server MTUs. Optionally, in some of these embodiments, when a connection is disconnected due to a small server MTU, the connection is allowed to be reestablished with a different server 102, having a larger server MTU.

In some embodiments of the invention, even before identifying that a connection from a client carries packets that will require fragmentation, load balancer 104 forces a maximal packet size which is expected to avoid fragmentation. Optionally, load balancer 104 forces on each new connection a maximal packet size equal to the largest server MTU. Alternatively or additionally, load balancer 104 forces on some client connections the smallest server MTU of servers 102 serviced by load balancer 104. In some embodiments of the invention, load balancer 104 selects the server 102 which is to service client 106 before the maximal packet size is to be imposed by load balancer 104, and the maximal packet size imposed is chosen according to the selected server 102. Alternatively, load balancer 104 selects the server 102 which is to service client 106 after imposing the maximal packet size by load balancer 104. The maximal packet size imposed is chosen based on an estimate of the server 102 to be selected, for example based on the relative loads of the servers. Optionally, for clients 106 which previously connected to load balancer 104, list 108 lists the maximal packet size to be imposed and optionally a group of servers 102 which can service the client with the imposed maximal packet size. The server 102 to service the client 106 is optionally selected from the list of respective servers 102 for the client in list 108.

In some embodiments of the invention, load balancer 104 checks for fragmented packets throughout the entire duration of the connections. Alternatively or additionally, in order to reduce the processing requirements from load balancer 104, load balancer 104 only checks a predetermined number of packets passing on the connection after the establishment of the connection. Thereafter, it is expected that the same packet sizes will be used throughout the duration of the connection and therefore the additional checks are superfluous.

It is noted that load balancer 104 may operate in accordance with substantially any load balancing method and/or connection establishment method known in the art. Particularly, load balancer 104 may select servers 102 according to, for example, network layer data, transport layer data and/or application layer data. Furthermore, load balancer 104 may operate, for example, in accordance with triangulation, half NAT, full NAT and/or splicing methods.

The above description of the method of FIG. 2, in which load balancer 104 prevents fragmentation, assumes that load balancer 104 intervenes with a connection established directly between a client 106 and a server 102. As mentioned above, however, in some embodiments of the invention, load balancer 104 establishes separate connections with client 106 and server 102. In these embodiments, load balancer 104 optionally forces both the connections to use maximal packet sizes that do not require fragmentation on each of the connections and/or during the transfer of packets between connections. In an exemplary embodiment of the invention, load balancer 104 affects the maximal packet size by setting the MSS field for the established connections. Thus, in these exemplary embodiments, load balancer 104 does not change packets established by other entities, but affects the values of fields of packets generated by load balancer 104 itself.

In some embodiments of the invention, load balancer 104 preestablishes connections between load balancer 104 and servers 102, as described in U.S. patent application Ser. No. 09/793,455 filed Feb. 26, 2001, the disclosure of which is incorporated herein by reference.

It is noted that load balancer 104 may be implemented in hardware, software or any combination thereof. Optionally, load balancer 104 comprises a hardware unit which handles packets from non fragmented packets and transfers packets from fragmented packets to a processor running a software module.

It is noted that although the above description generally relates to a load balancer which services a farm of servers, in other embodiments of the invention, the methods of preventing fragmentation of the present invention are performed by other load balancers, such as load balancers which perform cache redirection. In still other embodiments of the invention, the methods of preventing fragmentation described above are performed by any other network element, including proxies, firewalls and/or various types of routers.

As described above, the methods of the present invention may be implemented on network elements that perform TCP termination and/or on network elements that do not perform TCP termination. Furthermore, although the above description relates to intermediary network elements which prevent fragmentation, as intermediary elements, in some cases it may be advantageous to employ the methods described above by one of the end points of a connection. That is, the end point of the connection optionally closes connections on which fragmented packets are received, transmits error messages to the source of the packets and/or forces subsequent connections to connect with maximal packet sizes that prevent fragmentation.

It is further noted that although the present invention has been described in relation to the TCP/IP protocol suite, some embodiments of the invention may be implemented with relation to other packet based transmission protocols, such as, for example IPX, DECNET and the ISO protocols. Furthermore, although the above description relates to the HTTP protocol, the principles of the invention may be used with other application protocols, such as the HTTPS, the FTP protocol and/or substantially any other protocol over TCP or over a similar protocol.

It will be appreciated that the above described methods may be varied in many ways, including, changing the order of steps, and the exact implementation used. For example, the checking of whether the packet is fragmented may be performed before checking if the packet is a connection request. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of avoiding packet fragmentation, comprising:
receiving a data packet belonging to a data connection;
determining whether the received data packet is expected to be fragmented on the way to its destination;
registering the data connection of the received data packet in a list of connections that carried packets that were expected to be fragmented;
disconnecting the connection to which the received data packet belongs, responsive to a determination that the received data packet is expected to be fragmented; and
identifying a request to form a subsequent connection by at least one end unit of the disconnected connection and forcing the subsequent connection to use packets of a size up to a maximal size smaller than or equal to a size of the received data packet.

2. A method according to claim 1, wherein receiving the data packet comprises receiving a packet belonging to a transmission control protocol (TCP) connection.

3. A method according to claim 1, wherein receiving the data packet and registering the connection are performed by an intermediate network element, which is not the at least one end unit of the connection.

4. A method according to claim 3, wherein the intermediate network element comprises a load balancer.

5. A method according to claim 3, wherein the intermediate network element comprises a firewall.

6. A method according to claim 3, wherein the intermediate network element comprises a proxy.

7. A method according to claim 3, wherein the intermediate network element does not establish a TCP connection with a source of the received data packet.

8. A method according to claim 3, wherein the intermediate network element establishes a TCP connection with a source of the received data packet.

9. A method according to claim 1, wherein determining whether the received data packet is expected to be fragmented comprises determining whether the received data packet is to be fragmented by a determining unit.

10. A method according to claim 1, wherein determining whether the received data packet is expected to be fragmented comprises measuring the maximal transmission unit (MTU) of a path to the destination of the received data packet and determining whether the received data packet is larger than the determined MTU.

11. A method according to claim 10, wherein measuring the MTU is performed before receiving the data packet.

12. A method according to claim 10, wherein measuring the MTU is performed after receiving the received data packet.

13. A method according to claim 1, comprising transmitting an error message to one of the at least one end unit of the connection, instructing the one of the at least one end unit to use a maximal packet size included in the error message.

14. A method according to claim 13, wherein the maximal packet size included in the error message comprises the size of the received data packet.

15. A method according to claim 13, wherein the maximal packet size included in the error message comprises a size different from the size of the received data packet.

16. A method according to claim 15, wherein the maximal packet size included in the error message comprises a size determined as the maximum transmission unit (MTU) of a path from a unit performing the determination to a destination of the received data packet.

17. A method according to claim 1, wherein identifying a request to form a subsequent connection by the at least one end unit of the disconnected connection comprises identifying a subsequent request to form a connection between the at least one end unit of the disconnected connection.

18. A method according to claim 1, comprising registering the data connection of the received data packet in the list of connections comprises registering the data connection according to an identity of a source of the received data packet.

* * * * *